(12) United States Patent
Lutnick et al.

(10) Patent No.: US 7,765,149 B2
(45) Date of Patent: *Jul. 27, 2010

(54) METHODS AND SYSTEMS FOR INCENTIVIZING PARTICIPATION IN A MARKETPLACE THROUGH THE ISSUANCE OF WARRANTS

(75) Inventors: Howard W. Lutnick, New York, NY (US); Joseph Noviello, New York, NY (US); Jonathan Uman, Westport, CT (US); Julie Uman, legal representative, Westport, CT (US); Frederick Varacchi, Greenwich, CT (US); Eileen Varacchi, legal representative, Greenwich, CT (US)

(73) Assignee: BGC Partners, Inc., New York, NY (US)

(*) Notice: Subject to any disclaimer, the term of this patent is extended or adjusted under 35 U.S.C. 154(b) by 83 days.

This patent is subject to a terminal disclaimer.

(21) Appl. No.: 11/674,704

(22) Filed: Feb. 14, 2007

(65) Prior Publication Data

US 2008/0195521 A1 Aug. 14, 2008

(51) Int. Cl.
*G06Q 40/00* (2006.01)
(52) U.S. Cl. .................. 705/37; 705/35; 705/36 R
(58) Field of Classification Search .............. 705/1, 705/35, 36 R, 37, 38, 39, 40
See application file for complete search history.

(56) References Cited

U.S. PATENT DOCUMENTS

| | | | |
|---|---|---|---|
| 3,573,747 A | 4/1971 | Adams et al. | |
| 4,412,287 A | 10/1983 | Braddock, III | |
| 4,674,044 A | 6/1987 | Kalmus et al. | |
| 4,903,201 A | 2/1990 | Wagner | |
| 5,270,922 A | 12/1993 | Higgins | |
| 5,297,032 A | 3/1994 | Trojan et al. | |
| 5,315,634 A | 5/1994 | Tanaka et al. | |
| 5,715,402 A | 2/1998 | Popolo | |
| 5,717,989 A | 2/1998 | Tozzoli et al. | |
| 6,151,588 A | 11/2000 | Tozzoli et al. | |
| 6,345,261 B1 | 2/2002 | Feidelson et al. | |
| 6,629,081 B1 * | 9/2003 | Cornelius et al. | 705/30 |

(Continued)

FOREIGN PATENT DOCUMENTS

WO   WO 00/48109   8/2000

OTHER PUBLICATIONS

Business Wire, "Interim report for FvrenigsSparkbanken—Swedbank—" (Apr. 28, 2000) pp. 1-3.

(Continued)

*Primary Examiner*—Alexander Kalinowski
*Assistant Examiner*—Kellie Campbell
(74) *Attorney, Agent, or Firm*—Ruth J. Ma

(57) ABSTRACT

Methods and corresponding system are provided herewith that, in at least one embodiment, include the act or acts of issuing at least one warrant to a participant, in which the warrant is convertible into at least one ownership share of an entity associated with a marketplace; receiving information associated with the participant's execution of trading activities in the marketplace; determining, based on the received information, a quantity of warrants eligible for conversion into ownership shares; converting the eligible warrants into a quantity of ownership shares; and transmitting an indicia indicating the quantity of ownership shares.

26 Claims, 5 Drawing Sheets

U.S. PATENT DOCUMENTS

| | | | |
|---|---|---|---|
| 7,089,204 B1* | 8/2006 | Nieboer et al. | 705/37 |
| 7,096,194 B2 | 8/2006 | Johnson | |
| 2001/0039500 A1* | 11/2001 | Johnson | 705/1 |
| 2002/0032636 A1* | 3/2002 | Shields et al. | 705/37 |
| 2002/0052818 A1 | 5/2002 | Loveland | |
| 2003/0004799 A1* | 1/2003 | Kish | 705/14 |
| 2005/0080706 A1* | 4/2005 | Birle et al. | 705/37 |

OTHER PUBLICATIONS

USPTO Office Action for U.S. Appl. No. 09/963,197, Aug. 29, 2002 (11 pages).
USPTO Office Action for U.S. Appl. No. 09/963,197, Sep. 16, 2003 (12 pages).
USPTO Office Action for U.S. Appl. No. 09/963,197, Aug. 30, 2004 (13 pages).
USPTO Office Action for U.S. Appl. No. 09/963,197, Jul. 14, 2005 (11 pages).
U.S. Appl. No. 09/963,197, filed Sep. 25, 2001, Lutnick, et al.
U.S. Appl. No. 11/674,706, filed Feb. 14, 2007, Lutnick et al.
USPTO Office Action for U.S. Appl. No. 09/963,197, Nov. 7, 2005 (3 pages).
USPTO Office Action for U.S. Appl. No. 09/963,197, Apr. 18, 2006 (5 pages).
USPTO Office Action for U.S. Appl. No. 09/963,197, Jun. 19, 2007 (7 pages).
USPTO Office Action for U.S. Appl. No. 09/963,197, Jan. 10, 2008 (11 pages).
International Search Report for International Application No. PCT/US02/27418, Mar. 7, 2003 (3 pages).
USPTO Office Action for U.S. Appl. No. 09/963,197, Feb. 5, 2009 (9 pages).
USPTO Office Action for U.S. Appl. No. 11/674,706, Oct. 3, 2008 (38 pages).
USPTO Office Action for U.S. Appl. No. 09/963,197, Mar. 20, 2009 (8 pages).
USPTO Office Action for U.S. Appl. No. 11/674,706, May 29, 2009 (24 pages).
USPTO Examiner Interview Summary for U.S. Appl. No. 09/963,197, Nov. 1, 2002 (2 pages).
USPTO Office Action for U.S. Appl. No. 09/963,197, Jan. 14, 2004 (5 pages).
USPTO Examiner Interview Summary for U.S. Appl. No. 09/963,197, Dec. 23, 2004 (3 pages).
USPTO Examiner Interview Summary for U.S. Appl. No. 09/963,197, Feb. 4, 2005 (4 pages).
USPTO Examiner Interview Summary for U.S. Appl. No. 09/963,197, Feb. 13, 2009 (2 pages).
USPTO Notice of Allowance and Fees Due for U.S. Appl. No. 09/963,197, Sep. 4, 2009 (7 pages).
USPTO Notice of Allowance and Fees Due for U.S. Appl. No. 09/963,197, Sep. 22, 2009 (3 pages).
USPTO Examiner Interview Summary for U.S. Appl. No. 11/674,706, Oct. 29, 2009 (4 pages).
UK Examination Report for Application No. GB0406761.7 dated Sep. 30, 2004 (3 pages).
EPO Search Report and Declaration for Application No. 02255943.9 dated Jan. 24, 2003 (2 pages).

* cited by examiner

METHODS AND SYSTEMS FOR INCENTIVIZING PARTICIPATION IN A MARKETPLACE THROUGH THE ISSUANCE OF WARRANTS

CROSS REFERENCE TO RELATED APPLICATION

This present application claims priority to U.S. patent application Ser. No. 09/963,197, filed Sep. 25, 2001, which in return, claims priority to U.S. Provisional Patent Application No. 60/315,259, filed on Aug. 27, 2001. Both applications are hereby incorporated herein by reference.

BACKGROUND OF THE INVENTION

This invention relates to a vertical market and, more particularly, to a vertical market in which incentives to generate revenue are provided to those members of the market that enter into an agreement to exchange goods and services directly between each other.

A vertical market is a market that meets the needs of a particular industry; for example, a piece of equipment used only by semi-conductor manufacturers (as opposed to a horizontal market which is a market that meets a given need of a wide variety of industries—e.g., word processing software). In some instances, the members of the market buy and sell goods indirectly to and from each other through the third party. In these instances, the members of the vertical market lose potential revenues due to transaction costs, taxes, and other associated costs. To avoid the loss of these transactional costs, agreements may be reached among the members of a vertical market in which the members agree to trade directly with each other. In agreements such as these, the potential revenues due to transaction costs, taxes, and other associated costs may be saved.

It would be desirable to incentivize the members of a vertical market to participate in an agreement among the members of the vertical market, which agreement encourages participants to deal with participants of the market agreement.

SUMMARY OF THE INVENTION

Therefore, it is an object of this invention to incentivize the members of a vertical market to participate in an agreement among the members of the vertical market.

This and other objects are accomplished in accordance with the principles of the present invention by providing systems and methods for using an incentive based vertical market.

A vertical market is provided in which entities that are active in a market enter into an agreement. Each of the participants of the agreement preferably owns a percentage of the goods and services exchanged within the market. The participants of the agreement may be encouraged or, on other words, incentivized—i.e., provided with incentives—to purchase and sell goods and services and, in turn, generate more revenue for the market. Such incentives may include, growth incentives, success incentives, and incentives based on services provided.

Portions of the revenues generated by all of the participants of the agreement may be paid to the participants based on percent-ownership of the market or based on some other suitable characteristic. The participants of the agreement are incentivized to generate revenue. These incentives may include the option to convert warrants, issued at the inception of the agreement, at the full conversion rate into ownership shares of the goods and services owned by the participants of the agreement. The warrants may be converted at a one-to-one ratio or some others suitable ratio. The warrants may also be converted at any conversion rate.

Warrants may be converted at the full conversion rate when, for example, a pre-determined amount of gross revenue is achieved within a certain amount of time—e.g., a rolling twelve-month period. In another suitable embodiment, an amount of warrants may be converted at the full conversion rate based on the ratio of gross revenue generated within a certain amount of time—e.g., a calendar year—over the target amount of gross revenue to be generated within a certain time—e.g., five years. Participants of the agreement may also be incentivized to exchange goods and services based on services provided. For example, participants may be entitled to fees of revenues for services they provide. Thus, the members of a vertical market are incentivized to participate in an agreement among the members of the vertical market.

BRIEF DESCRIPTION OF THE FIGURES

Further features of the invention, its nature and various advantages will be more apparent from the accompanying drawings and the following detailed description of the preferred embodiments.

DETAILED DESCRIPTION

Members of a vertical market may enter into an agreement. The participants of the agreement may exchange goods and services directly with each other, thereby potentially reducing losses due to transaction costs, taxes, and other associated costs from dealing with third parties.

The participants of the agreement are incentivized—i.e., incentives are provided—to keep the terms in the agreement in order to generate revenue. Such an incentive may be a growth incentive. Growth warrants may be issued at the inception of the agreement. The growth warrants may be converted into ownership shares or some other suitable security, representing ownership in the goods and services owned by the participants of the agreement. The ownership shares may be converted at a one-to-one ratio, or some other suitable ratio. The growth warrants may be converted based on the growth of the market.

Another example of an incentive is a success incentive. Success warrants may also be issued at the inception of the agreement. The success warrants may be converted into ownership shares, or some other suitable security, at a one-to-one ratio, or some other suitable ratio. The success warrants may be converted based on the success of the market.

Participants may also be entitled to fees of revenues for services they provide.

Figure 1:
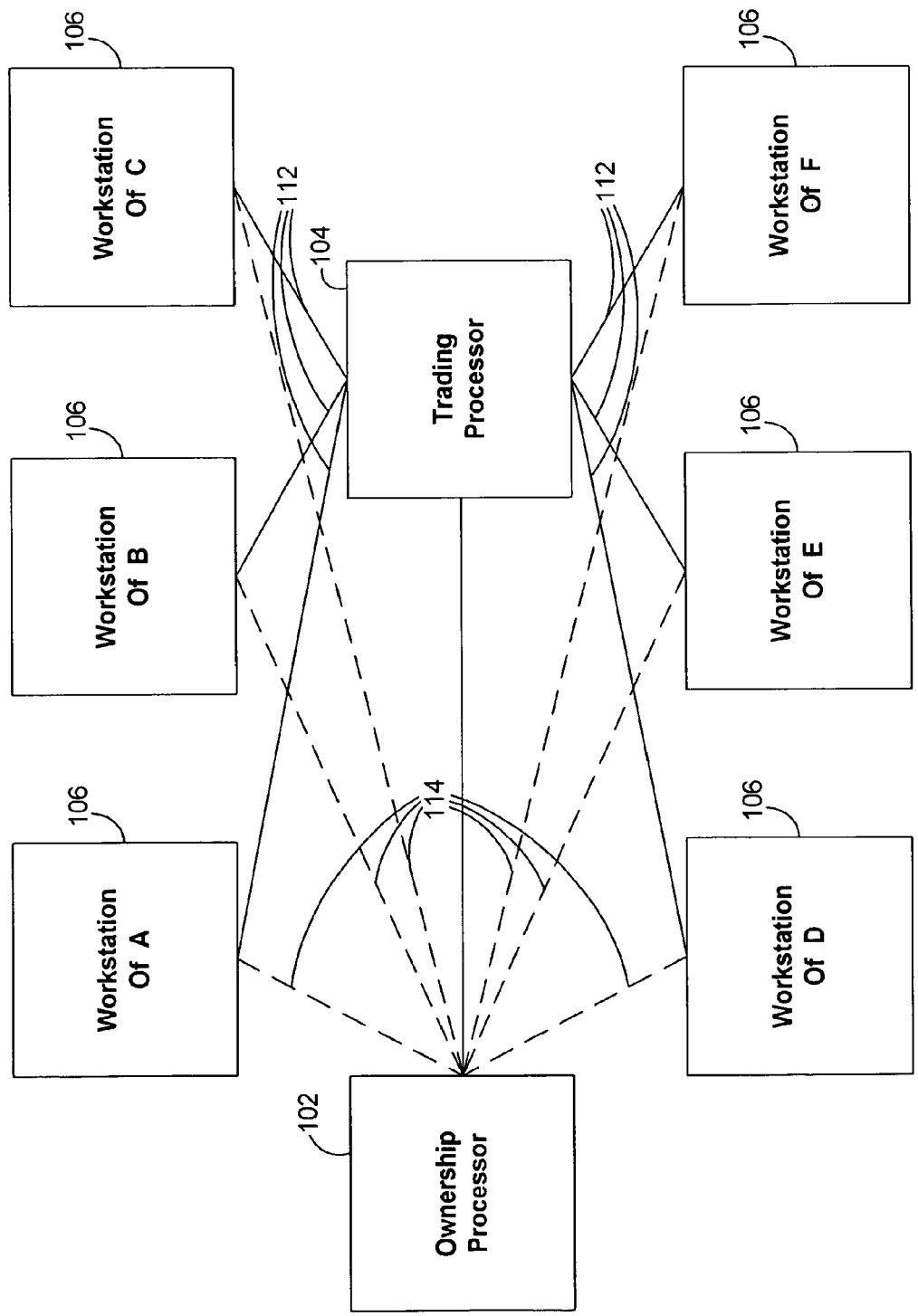
FIG. 1 is a block diagram of an illustrative trading system in accordance with the principles of one embodiment of the present invention.

An illustrative electronic trading system 100 of an incentive-based vertical market in accordance with the present invention is shown in FIG. 1. Illustrative trading system 100 may include an ownership processor 102, a trading processor 104, and several workstations 106. Electronic trading system 100 may include any hardware, software, network infrastructure, or any other suitable components that may be used to effect transactions on or through the vertical market.

Workstations 106 may be used to effect transaction on or through the vertical market. Workstations 106 may be implemented on any suitable hardware. Suitable hardware may include personal computers, servers, or any other suitable hardware that includes a processor. Workstations 106 may be used by the participants of the agreement. For example, the workstation 106 labeled workstation A may be used by participant A. The workstation 106 labeled workstation B may be used by participant B. Although market 100 is shown with six workstations 106, it is to be understood that market 100 may include any suitable number of workstations 106.

The participants of the agreement may individually use workstations 106 to exchange and purchase goods and services. Transactions between participants may run on workstations 106 and may be handled by trading processor 104. Trading processor 104 may include any suitable processor to process any suitable transaction. Trading processor 104 may be implemented on any suitable hardware such as a computer.

Ownership processor 102 may be any suitable equipment or device capable of tracking revenues, commissions, profits, dates, etc. Ownership processor 102 may be capable of determining a reward each participant of the agreement receives when certain events occur or thresholds are achieved. For example, ownership processor 102 may determine how many warrants each participant of the agreement can convert at a predetermined conversion rate when, for example, a threshold is achieved.

As shown in FIG. 1, information may be communicated between trading processor 104 and workstations 106 via communications paths 112. Paths 112 may be any suitable communications paths. Paths 112 may be, for example, wired or wireless paths, and may be part of a communications network. As also shown in FIG. 1, ownership information may be communicated between ownership processor 102 and workstation 104 via delivery paths 114. Delivery paths 114 may be any suitable communications paths. Delivery paths 114 may be, for example, wired or wireless paths, and may be part of a communications network.

Figure 2:
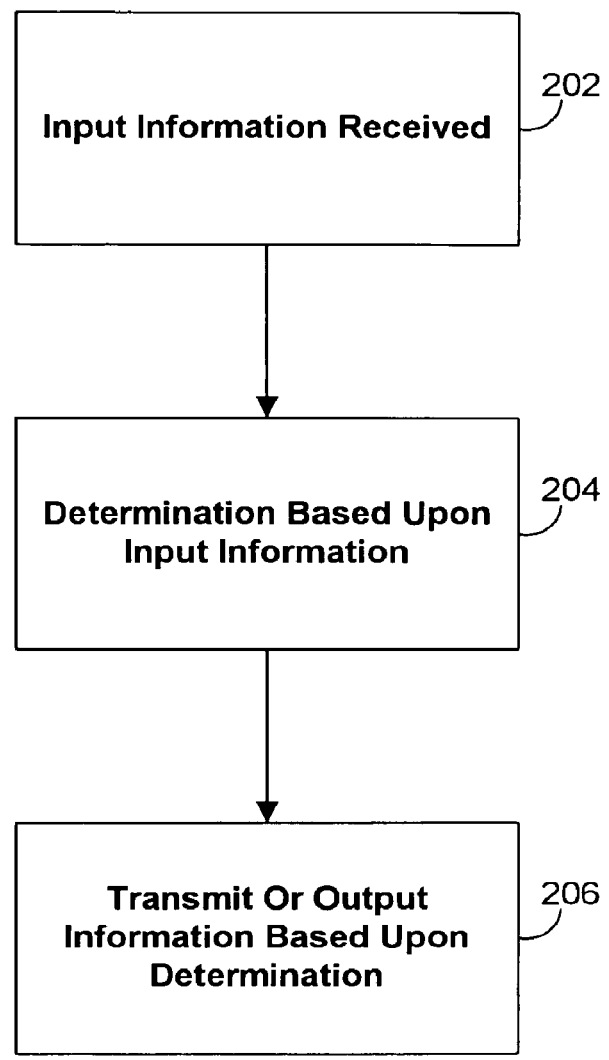
FIG. 2 is a flow chart of illustrative steps of an ownership processor in accordance with the principles of one embodiment of the present invention.

As shown in the illustrative flow chart of FIG. 2, ownership processor 102 may make a determination based upon input information, and then transmit or output information based on that determination. At step 202, ownership processor 102 may receive input information—e.g., dates, revenue information, transaction information, etc. This input information may be received from any suitable location such as trading processor 104, workstations 106, or any other suitable location.

At step 204, ownership processor 204 may make a determination based upon the input information. Such a determination may be, for example, that a target revenue has been reached, how many warrants each participant may convert, or any other suitable determination.

At step 206, ownership processor 102 may output information based on the determination. Ownership processor 102 may output this information to any suitable location such as trading processor 104 or workstations 106. These illustrative steps are merely exemplary. Any suitable steps may be taken for ownership processor 102 to receive information, make a determination based on that information, and output information based on the determination.

In one suitable embodiment of the present invention, the amount of warrants that may be converted into ownership shares at the full conversion rate may be based on the growth of the market. An agreement based on a growth incentive may have a target gross revenue to be achieved by the end of the term of the agreement. Per the rules of the agreement, warrants may be converted into ownership shares at the full conversion rate based on the growth of the market—i.e., gross revenues—monthly, quarterly, semiannually, annually, or for any other predetermined period of time.

Upon the end of the predetermined period of time, a written certificate setting forth how many warrants may be converted into ownership shares at the full conversion rate may be prepared—e.g., by a Chief Financial Officer of a corporation of one of the participants—and delivered to the recordholders of the growth warrants. In another suitable approach, notification of how many warrants may be converted into ownership shares at the full conversion rate may be automatically delivered by ownership processor 102 to the recordholders of the growth warrants. At such a time, the growth warrants may be converted at the full conversion rate. Again, these examples are merely illustrative and other suitable approaches to converting ownership shares or other suitable securities may be implemented. The ownership shares, or other suitable securities may also be converted at a conversion rate other than the full conversion rate.

For the purpose of clarity, and not by way of limitation, the amount of warrants that may be converted into ownership shares (or other suitable securities) at the full conversion rate based on the growth of the market is demonstrated primarily in the context of annual periods. The amount of warrants that may be converted into ownership shares (or other suitable securities) at the full conversion rate each annual period based on the growth of the market will be described as the annual amount. The annual amount may be based on the gross revenue during each annual period.

The way to calculate the annual amount each annual period may be predefined per the arrangements of the agreement of the participants. The calculation of the annual amount may vary from annual period to annual period. For example, the annual amount of the first annual period of an agreement may be based on the gross revenues for that annual period. The annual amount of an annual period other than the first annual period of an agreement may be based on the gross revenue for the current annual period less the gross revenue of the preceding annual period.

For example, for the first annual period of an agreement, the annual amount may be calculated as follows: the gross revenue is divided by the target revenue—i.e., the target revenue to be achieved by the end of the term of the agreement—and multiplied by the amount of the growth warrants issued under the arrangements of the agreement. For example, if the gross revenue for the first annual period of an agreement is $50,000,000, the target revenue is $250,000,000 (over a period of six annual periods) and the amount of growth warrants that may be issued (over the period of six annual periods) is 5,000,000, then the annual amount for the first annual period is 1,000,000—i.e., ($50M/$250M)*5M=1M [the total annual periods does not form part of the equation to issue warrants]. Thus, 1,000,000 growth warrants may be converted at the full conversion rate into ownership shares (or some other suitable security). Ownership processor 102 may notify the participants of the agreement how many growth warrants each participant may convert into ownership shares (or some other suitable security) at the full conversion rate based on their percent ownership of the market or some other suitable determinant.

In subsequent annual periods of an agreement, the excess (if an excess exists) of the gross revenue over the immediately preceding annual period may be divided by the target revenue and multiplied by the amount of the growth warrants to calculate the annual amount for those subsequent annual periods. For example, if the gross revenue of the participants at the end of the second annual period of the agreement is $100,000,000, the gross revenue of the first annual period— i.e., the immediately preceding annual period—of the agreement is $50,000,000, the target revenue is $250,000,000, and the amount of warrants issued is 5,000,000, the annual amount for the second annual period of the agreement is 1,000,000—i.e., (($100M−$50M)/$250M)*5M=1M.

Under the arrangements of the agreement, an excess may be deemed to exist for each period of time—e.g., each annual period—if the gross revenues for that period of time exceed the highest gross revenue theretofore achieved for any similar period of time. For example, if the highest gross revenue during a calendar year of an agreement is $25,000,000, an excess will not be deemed until more than $25,000,000 is achieved during a subsequent calendar year.

Under the arrangements of the agreement, the annual amount may be deemed a fixed amount if a pre-determined amount of gross revenue is not achieved within a specified time frame. For example, the annual amount may be deemed to be zero until the gross revenues exceed $10,000,000 during a calendar year.

Figure 3:
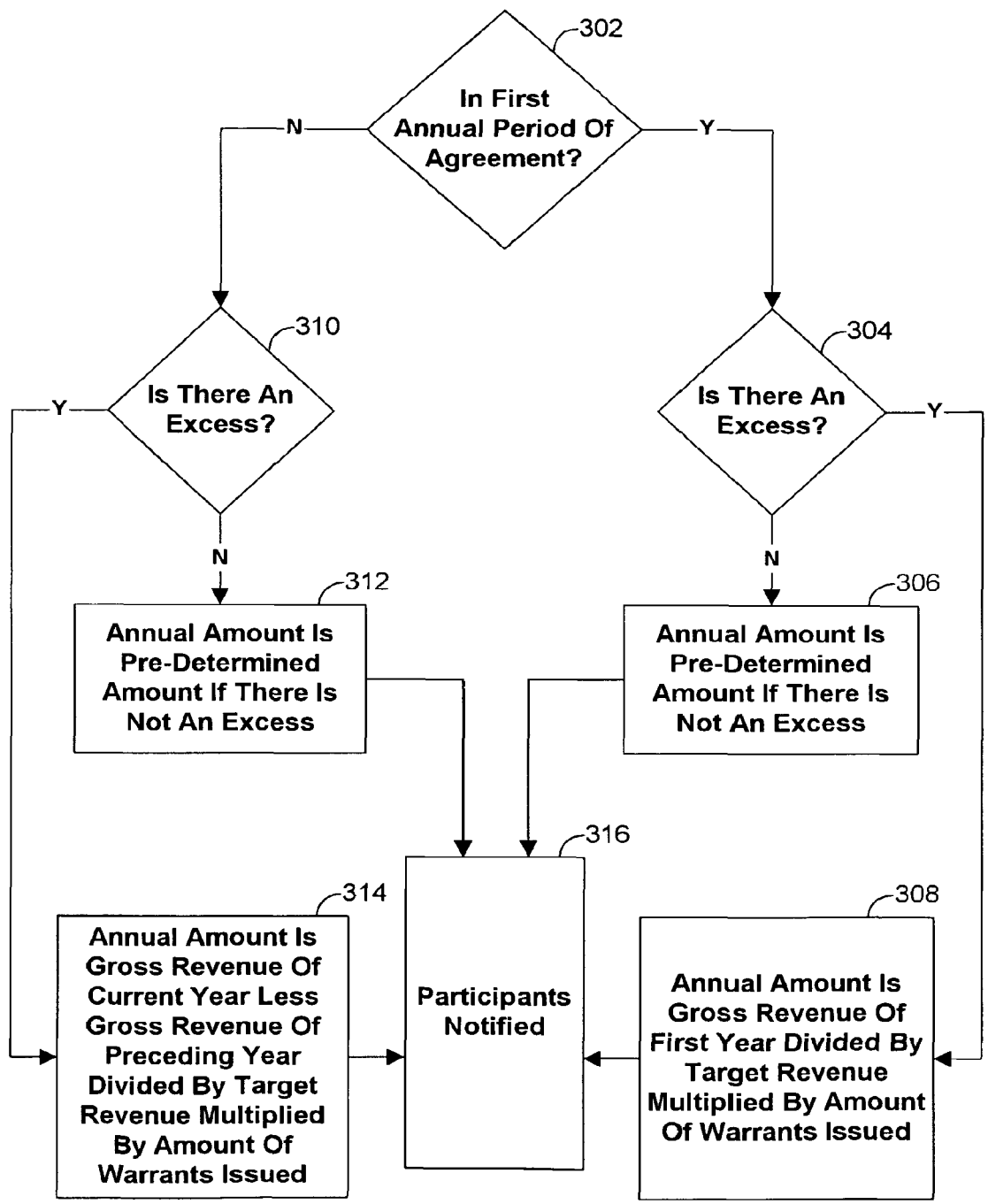
FIG. 3 is a flow chart of illustrative steps of a growth incentive in accordance with the principles of one embodiment of the present invention.

As shown in the illustrative flow chart of FIG. 3, the amount of warrants that may be converted into ownership shares (or other suitable securities) at the full conversion rate may be determined by ownership processor 102. In this illustrative example, the amount of warrants that may be converted at the full conversion rate is determined annually. At step 302, ownership processor 102 may determine whether or not the agreement is in the first annual period following inception. If the agreement is in the first annual period, ownership processor 102 may determine if there is an excess per the agreement of the participants. This may occur at step 304. If there is not an excess, ownership processor 104 may determine that the annual amount is a pre-determined amount per the agreement of the participants. This may occur at step 306. If, at step 304, ownership processor 104 determined that there was an excess, the annual amount may be determined per the agreement of the participants at step 308. For example, as shown in FIG. 3, the annual amount may be the gross revenue of the first annual period of the agreement divided by the target revenue multiplied by the amount of warrants issued per the agreement. This is merely an illustrative example.

If, at step 302, ownership processor 104 determined that the agreement is not in the first annual period since inception, ownership processor 102 may determine if there is an excess per the agreement of the participants. This may occur at step 310. If there is not an excess, ownership processor 104 may determine that the annual amount is a pre-determined amount per the agreement of the participants. This may occur at step 312. If, at step 310, ownership processor 104 determined that there was an excess, the annual amount may be determined per the agreement of the participants. This determination may occur at step 314. For example, as shown in FIG. 3, the annual amount may be the gross revenue of the first annual period of the agreement divided by the target revenue multiplied by the amount of warrants issued per the agreement.

Upon the determination of the annual amount at steps 306, 308, 312, and 314, ownership processor 102 may notify the participants of the agreement of how many warrants may be converted at the full conversion rate (or some other rate). This may occur at step 316. This determination, and method of determination, is merely for illustrative purposes and may be implemented in any suitable fashion.

In another suitable embodiment of the present invention, the amount of warrants that may be converted into ownership shares (or some other suitable security) at the full conversion rate (or some other rate) may be based on the success of the market. The participants of the agreement are incentivized to achieve targets—i.e., success incentives are provided per the agreement. Such a success incentive may be to reach a target gross revenue within a specified period of time—e.g., within a calendar year, a rolling six-month period, per quarter, etc. For example, when a target of $50,000,000 of gross revenue is achieved in any rolling twelve-month period, 1,000,000 shares of success warrants may be converted at the full conversion rate.

Upon achievement of a target, a written certificate setting forth such an achievement may be prepared—e.g., by a Chief Financial Officer of a corporation of one of the participants— and delivered to the recordholders of the success warrants. In another suitable approach, notification of the achievement of such an event may be automatically delivered by ownership processor 102 to the recordholders of the success warrants.

Ownership processor 102 may notify the participants of the agreement of how many success warrants each participant may convert into ownership shares (or some other suitable security) at the full conversion rate (or at some other rate) based on their percent ownership of the market. At such a time, the success warrants may be converted at the full conversion rate or any other suitable conversion rate. This example is merely illustrative. When any suitable target— e.g., revenue, time period, etc.—is achieved, an event—e.g., notification of ability to convert warrants at full conversion rate—may occur.

Figure 4:
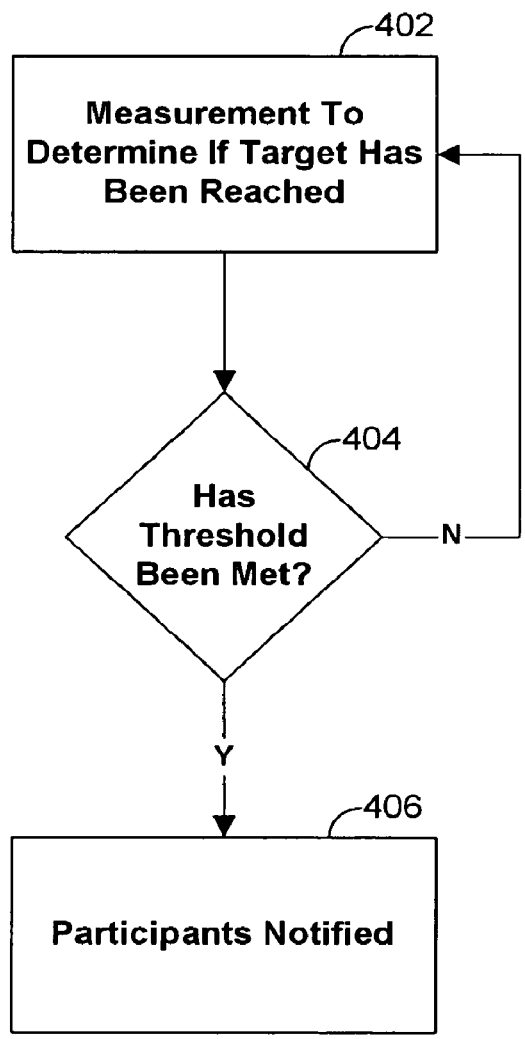
FIG. 4 is a flow chart of illustrative steps of a success incentive in accordance with the principles of one embodiment of the present invention.

As shown in the illustrative flow chart of FIG. 4, a processor may measure, for example, the time, the date, gross revenue, or any other suitable value or event data. A calculation may be made based on these measurements to determine if an event or threshold has been met. If the threshold has not been met, another measurement of the time, date, gross revenue, etc. may be taken. In another suitable approach, measurements may be constantly and continuously taken. If the threshold has been met, the participants of the agreement may be rewarded for their success. Such a reward may be, for example, the ability to convert warrants into ownership shares at the full conversion rate.

At step 402, a measurement of data may be made. This measurement may be the measurement of one of time, the date, revenues, any other suitable measurement, or any combination of the same to determine if the target has been reached. Such a measurement may be made by ownership processor 102, trading processor 104, or any combination thereof. At step 404, ownership processor 102 may determine if a threshold for the value or event has been met. If a threshold has not been met, another measurement—e.g., at step 402—may be taken. If a threshold has been met, ownership processor 102 may notify the participants of the agreement that a target has been reached. This may occur at step 406. This example is merely illustrative of the principles of the invention. Any suitable approach to determine if a target has been reached and to notify the participants of such an event may be used.

Participants of the agreement may also be provided with incentives based on services provided. Such incentives may be, for example, fees of revenues for services they provide.

For example, a participant that provides electronic transaction services may be entitled to a fee of revenues for, for example, utilization of that participant's services in support of voice assisted brokerage services, web-hosted services, and other electronic auction, reverse auction e-commerce and value added opportunities and any other similar services provided. These other services may be provided by another participant with systems and technology support provided by, or otherwise arranged, by the participant that provides the electronic transaction services. Such revenues may include fees, commissions, spreads, markups, charges or other similar amounts received by the other participant (e.g., the participant that does not provide electronic transaction services), directly or indirectly, in connection with these other services. These examples are merely illustrative. Any suitable participant may be entitled to a fee of revenues for providing any suitable service.

These fees may change during the pendency of the agreement. For example, in an agreement in which there is a participant that provides electronic transaction services and another participant that provides voice transaction services, and a voice transaction occurs during the first annual period of the agreement, the fee paid to the participant that provides electronic transaction services may be the net of the cost for salaries, bonuses and benefits paid to brokers employed by the participant that provides voice transactions services to provide, for example, voice-assisted brokerage services. During subsequent annual periods of the agreement, the fee that is paid to the participant that provides electronic transaction services may be a greater or lesser amount than the net of the cost for salaries, bonuses and benefits paid to brokers employed by the participant that provides voice transactions services to provide, for example, voice-assisted brokerage services.

Voice assisted brokerage services may include transactions involving a product of the market, or derivative thereof, including futures contracts and options on futures contracts involving a product of the market, or a derivative thereof, on or through the market in and through a broker or other human intermediary, in each case who is an employee of, or providing services to, the participant of the agreement that provides voice transactions services.

In those embodiments in which there is an information services transaction, a participant may be entitled to a fee of the information services revenues for providing the utilization of services in support of information services. Information services may include the provision and sale of information with respect to the market as a separate service not in connection with transactions by that participant on or through the market.

Figure 5:
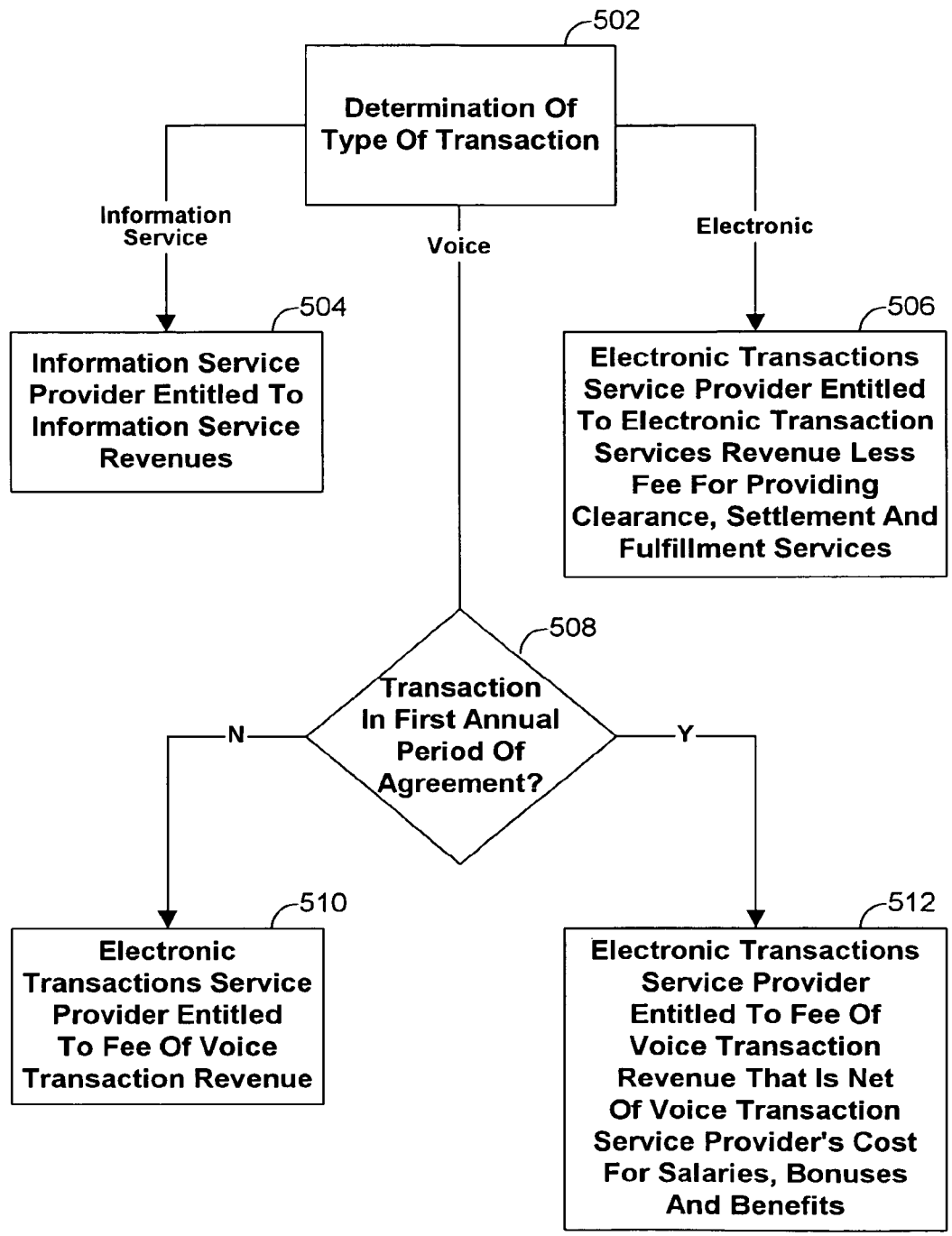
FIG. 5 is a flow chart of illustrative steps of incentives for services provided in accordance with the principles of one embodiment of the present invention.

The flow chart of FIG. 5 shows illustrative steps that may be used to determine which participants of the agreement are entitled to fees for certain services. At step 502, trading processor 104 may determine if a transaction is an electronic transaction, a voice-assisted transaction, or an information services transaction. These examples are merely illustrative. Trading processor 104 may determine if a transaction is any kind of transaction.

If, at step 502, trading processor 104 determines that a transaction is an information services transaction, trading processor 104 or ownership processor 102 may determine that a participant that provides the information service is entitled to revenues for the information service. This may occur at step 504.

If, at step 502, trading processor 104 determines that a transaction is an electronic transaction, trading processor 104 or ownership processor 102 may determine that a participant that provides the electronic transaction service is entitled to electronic transaction service revenues less fees for, for example, providing clearance, settlement, and fulfillment services. As shown, this may occur at step 506.

If, at step 502, trading processor 104 determines that a transaction is a voice transaction, trading processor 104 or ownership processor 102 may determine if the transaction is within the first annual period of the agreement. This may occur at step 508. This time period is merely illustrative as is the requirement for a determination. Any suitable time period or occurrence of an event—e.g., reaching a target revenue—may be used as a factor in determining what steps ownership processor 102 or trading processor 104 take next. If trading processor 104 determines that the transaction is within the first annual period of the agreement, trading processor 104 may determine that a participant that provides electronic transactions services may be entitled to a fee of voice transaction revenues that is net of voice transaction service provider's cost for salaries, bonuses and benefits paid to brokers employed by the voice transaction service provider to provide voice-assisted brokerage services. This may occur at step 512. If trading processor 104 determines that the transaction is not within the first annual period of the agreement, trading processor 104 may determine that a participant that provides electronic transactions services may be entitled to a fee of voice transaction revenues that is greater or lesser than the net of voice transaction service provider's costs. This may occur at step 510.

Thus, systems and methods for using a bid/offer marketplace are provided. One skilled in the art will appreciate that the present invention can be practiced by other than the described embodiments, which are presented for purposes of illustration and not of limitation, and the present invention is limited only by the claims which follow.

What is claimed is:

1. A method for incentivizing a plurality of participants to trade goods and services of a vertical market on a marketplace, the method comprising:

using an ownership processor to issue at least one warrant to a participant who agrees to trade goods and services of the vertical market on the marketplace, in which each warrant is convertible into at least one ownership share of the marketplace based on the participant's performance on the marketplace;

receiving information about the participant's performance on the marketplace from a trading processor, in which the trading processor and the ownership processor are in communication over a network;

using the ownership processor to determine, based on the participant's performance, a quantity of warrants that is convertible by the participant into the at least one ownership share of the marketplace;

determining a type of transaction that is provided by the participant; determining, based on the type of transaction, a fee that is paid to the participant; and transmitting to the trading processor a notification of the quantity of warrants that is convertible by the participant and the fee that is paid.

2. The method of claim 1, in which the participant trades goods and services of the vertical market with other participants of an agreement.

3. The method of claim 1, in which the act of issuing the at least one warrant to the participant further comprises:

issuing a total amount of warrants in accordance to an agreement, in which the agreement is agreed upon by the plurality of participants in advance, and in which the agreement permits the participant to convert a portion of the total amount of warrants based on the participant's performance.

4. The method of claim 3, in which the act of determining the quantity of warrants that is convertible further comprises:
  receiving information about a revenue generated by the participant's performance on the marketplace within a period of time; and
  determining that the quantity of warrants that the participant is permitted to convert equals a product of the total amount of warrants issued and a ratio between the revenue and a target revenue,
in which the target revenue is generated over a term of the agreement and is pre-determined by the agreement.

5. The method of claim 3, in which act of determining the quantity of warrants that is convertible further comprises:
  receiving information about a revenue generated by the participant's performance on the marketplace;
  determining that the revenue meets a target revenue, in which the target revenue is pre-determined by the agreement; and
  determining that the quantity of warrants that the participant is permitted to convert equals a pre-determined quantity of warrants.

6. The method of claim 3, in which the act of determining the quantity of warrants that is convertible further comprises:
  receiving information about a revenue generated by the participant's performance on the marketplace within a period of time;
  determining that the revenue meets a target revenue, in which the target revenue is pre-determined by the agreement; and
  determining that the quantity of warrants that the participant is permitted to convert equals a pre-determined quantity of warrants.

7. The method of claim 1, in which the quantity of warrants is converted into the at least one ownership share of the at a full conversion rate.

8. The method of claim 1, in which the act of determining the type of transaction that is provided by the participant further comprises:
  determining that the participant provides an information services transaction;
  receiving information from the trading processor that an information services transaction has occurred on the marketplace; and
  determining that the fee to be paid to the participant comprises: a revenue that is derived from the information services transaction.

9. The method of claim 1, in which the act of determining the type of transaction that is provided by the participant further comprises:
  determining that the participant provides an electronic transaction; and
  receiving information from the trading processor that an electronic transaction has occurred on the marketplace
  determining that the fee to be paid to the participant comprises:
    a revenue that is derived from the electronic transaction less a fee for providing at least one of: a clearance, a settlement, and a fulfillment service.

10. The method of claim 1, in which the act of determining the type of transaction that is provided by the participant further comprises:
  determining that the participant provides an electronic transaction; and
  receiving information from the trading processor that a voice-assisted transaction has occurred on the marketplace;
  determining that the fee to be paid to the participant comprises:
    an amount paid by a voice transaction service provider in order to provide voice-assisted brokerage services.

11. An apparatus for incentivizing a plurality of participants to trade goods and services of a vertical market on a marketplace, the apparatus comprising:
  an ownership processor in communication with a trading processor over a network;
  a memory coupled to the ownership processor, in which the memory stores instructions which, when executed by the ownership processor, direct the ownership processor to:
    issue at least one warrant to a participant who agrees to trade goods and services of the vertical market on the marketplace, in which each warrant is convertible into at least one ownership share of the marketplace based on the participant's performance on the marketplace;
    receive information about the participant's performance on the marketplace from the trading processor;
    determine, based on the participant's performance, a quantity of warrants that is convertible by the participant into the at least one ownership share of the marketplace;
    determine a type of transaction that is provided by the participant;
    determine, based on the type of transaction, a fee that is paid to the participant; and
    transmit to the trading processor a notification of the quantity of warrants that is convertible by the participant and the fee that is paid.

12. The apparatus of claim 11, in which the participant trades goods and services of the vertical market with other participants of an agreement.

13. The apparatus of claim 11, in which the memory stores instructions which, when executed by the ownership processor, further direct the ownership processor to:
  issue a total amount of warrants in accordance to an agreement, in which the agreement is agreed upon by the plurality of participants in advance, and in which the agreement permits the participant to convert a portion of the total amount of warrants based on the participant's performance.

14. The apparatus of claim 13, in which the memory stores instructions which, when executed by the ownership processor, further direct the ownership processor to:
  receive information about a revenue generated by the participant's performance on the marketplace within a period of time;
  determine that the quantity of warrants that the participant is permitted to convert equals a product of the total amount of warrants issued and a ratio between the revenue and a target revenue, in which the target revenue is generated over a term of the agreement and is pre-determined by the agreement.

15. The apparatus of claim 13, in which the memory stores instructions which, when executed by the ownership processor, further direct the ownership processor to:
  receive information about a revenue generated by the participant's performance on the marketplace;
  determine that the revenue meets a target revenue, in which the target revenue is pre-determined by the agreement; and
  determine that the quantity of warrants that the participant is permitted to convert equals a pre-determined quantity of warrants.

16. The apparatus of claim 11, in which the memory stores instructions which, when executed by the ownership processor, further direct the ownership processor to:
- determine that the participant provides an information services transaction;
- receive information from the trading processor that an information services transaction has occurred on the marketplace; and
- determine that the fee to be paid to the participant comprises:
  - a revenue that is derived from the information services transaction.

17. The apparatus of claim 11, in which the memory stores instructions which, when executed by the ownership processor, further direct the ownership processor to:
- determine that the participant provides an electronic transaction; and
- receive information from the trading processor that an electronic transaction has occurred on the marketplace; and
- determine that the fee to be paid to the participant comprises:
  - a revenue that is derived from the electronic transaction less a fee for providing at least one of: a clearance, a settlement, and a fulfillment service.

18. The apparatus of claim 11, in which the memory stores instructions which, when executed by the ownership processor, further direct the ownership processor to:
- determine that the participant provides an electronic transaction; and
- receive information from the trading processor that a voice-assisted transaction has occurred on the marketplace;
- determine that the fee to be paid to the participant comprises:
  - an amount paid by a voice transaction service provider in order to provide voice-assisted brokerage services.

19. An article of manufacture for incentivizing a plurality of participants to trade goods and services of a vertical market on a marketplace, the article of manufacture comprising:
- a storage medium, in which the storage medium stores instructions which, when executed by an ownership processor, direct the ownership processor to:
- issue at least one warrant to a participant who agrees to trade goods and services of the vertical market on the marketplace, in which each warrant is convertible into at least one ownership share of the marketplace based on the participant's performance on the marketplace;
- receive information about the participant's performance on the marketplace from a trading processor, in which the trading processor and the ownership processor are in communication over a network;
- determine, based on the participant's performance, a quantity of warrants that is convertible by the participant into the at least one ownership share of the marketplace;
- determine a type of transaction that is provided by the participant;
- determine, based on the type of transaction, a fee that is paid to the participant ; and
- transmit to the trading processor a notification of the quantity of warrants that is convertible by the participant and the fee that is paid.

20. The article of manufacture of claim 19, in which the participant trades goods and services of the vertical market with other participants of an agreement.

21. The article of manufacture of claim 19, in which the memory stores instructions which, when executed by the ownership processor, further direct the ownership processor to:
- issue a total amount of warrants in accordance to an agreement, in which the agreement is agreed upon by the plurality of participants in advance, and in which the agreement permits the participant to convert a portion of the total amount of warrants based on the participant's performance.

22. The article of manufacture of claim 21, in which the memory stores instructions which, when executed by the ownership processor, further direct the ownership processor to:
- receive information about a revenue generated by the participant's performance on the marketplace within a period of time; and
- determine that the quantity of warrants that the participant is permitted to convert equals a product of the total amount of warrants issued and a ratio between the revenue and a target revenue, in which the target revenue is generated over a term of the agreement and is pre-determined by the agreement.

23. The article of manufacture of claim 21, in which the memory stores instructions which, when executed by the ownership processor, further direct the ownership processor to:
- receive information about a revenue generated by the participant's performance on the marketplace;
- determine that the revenue meets a target revenue, in which the target revenue is pre-determined by the agreement; and
- determine that the quantity of warrants that the participant is permitted to convert equals a pre-determined quantity of warrants.

24. The article of manufacture of claim 19, in which the memory stores instructions which, when executed by the ownership processor, further direct the ownership processor to:
- determine that the participant provides an information services transaction;
- receive information from the trading processor that an information services transaction has occurred on the marketplace; and
- determine that the fee to be paid to the participant comprises:
  - a revenue that is derived from the information services transaction.

25. The article of manufacture of claim 19, in which the memory stores instructions which, when executed by the ownership processor, further direct the ownership processor to:
- determine that the participant provides an electronic transaction; and
- receive information from the trading processor that an electronic transaction has occurred on the marketplace; and
- determine that the fee to be paid to the participant comprises:
  - a revenue that is derived from the electronic transaction less a fee for providing at least one of: a clearance, a settlement, and a fulfillment service.

26. The article of manufacture of claim 19, in which the memory stores instructions which, when executed by the ownership processor, further direct the ownership processor to:
  determine that the participant provides an electronic transaction; and
  receive information from the trading processor that a voice-assisted transaction has occurred on the marketplace;
  determine that the fee to be paid to the participant comprises: an amount paid by a voice transaction service provider in order to provide voice-assisted brokerage services.

* * * * *

UNITED STATES PATENT AND TRADEMARK OFFICE
CERTIFICATE OF CORRECTION

| | | |
|---|---|---|
| PATENT NO. | : 7,765,149 B2 | Page 1 of 1 |
| APPLICATION NO. | : 11/674704 | |
| DATED | : July 27, 2010 | |
| INVENTOR(S) | : Howard W. Lutnick et al. | |

It is certified that error appears in the above-identified patent and that said Letters Patent is hereby corrected as shown below:

Column 1, lines 9-10, delete "This present application claims priority to U.S. patent application Ser. No. 09/963,197, filed Sep. 25, 2001" and insert -- This present application is a continuation of U.S. Patent Application Serial No. 09/963,197, filed on September 25, 2001 --.

Signed and Sealed this
Thirtieth Day of October, 2012

David J. Kappos
*Director of the United States Patent and Trademark Office*